Nov. 3, 1959 R. T. ERBAN 2,910,878
MEANS FOR SYNCHRONIZING THE TILT OF ROLLERS
IN FRICTION TRANSMISSIONS
Filed Feb. 3, 1958 2 Sheets-Sheet 1
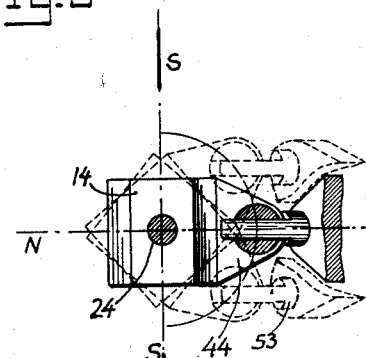
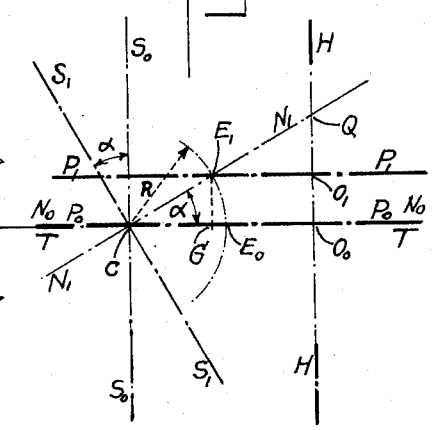
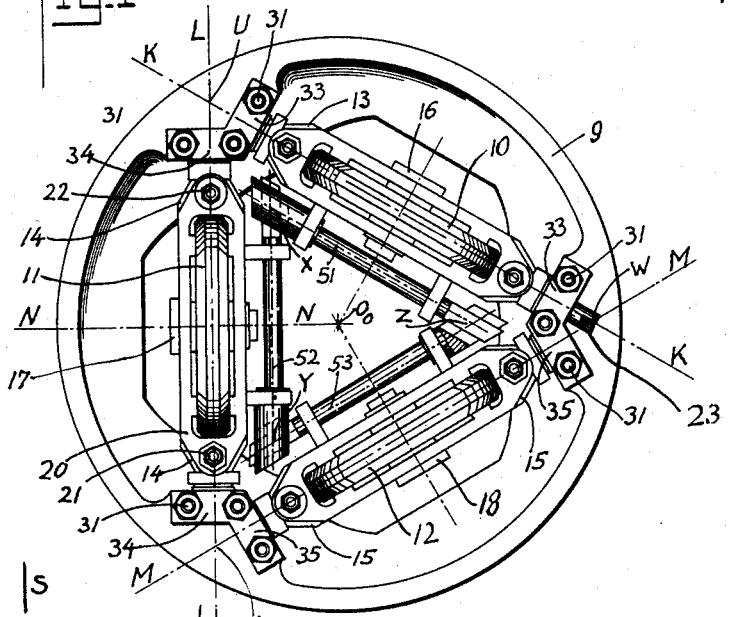
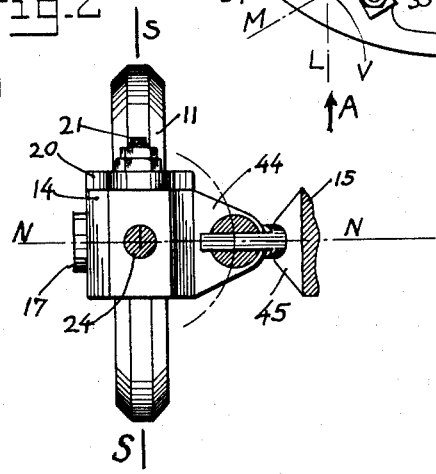
RICHARD T. ERBAN
INVENTOR.
BY
Richardson, David and Nordon
ATTYS

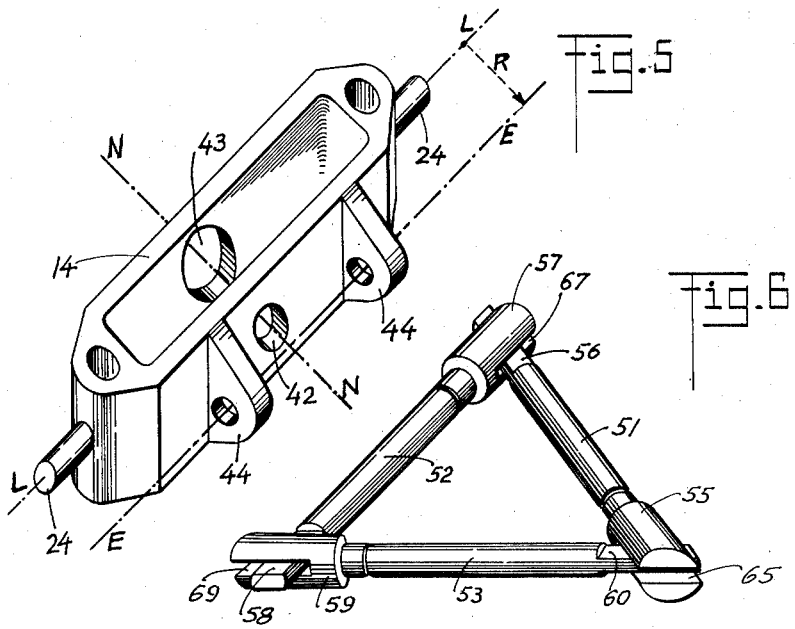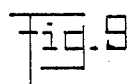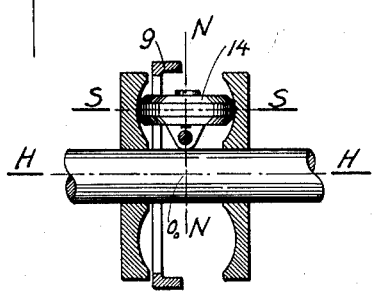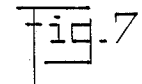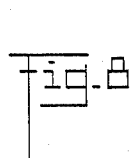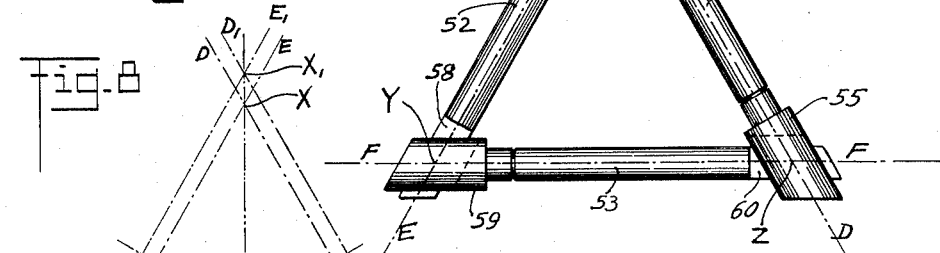

United States Patent Office

2,910,878
Patented Nov. 3, 1959

2,910,878

MEANS FOR SYNCHRONIZING THE TILT OF ROLLERS IN FRICTION TRANSMISSIONS

Richard T. Erban, Flushing, N.Y.

Application February 3, 1958, Serial No. 712,815

7 Claims. (Cl. 74—200)

This invention relates to variable speed friction transmissions and more specifically to the kind in which power is transmitted by a race and roller system using raceways with toroidal surfaces and tiltable rollers in driving contact therewith.

In the construction of this type of transmission for high specific power capacity, that is, where a substantial amount of power is transmitted by a mechanism of small weight and space requirement, it has been recognized that both rollers and races must be made from material capable of sustaining very high surface pressures, because the operating conditions of the rolling contact between the rollers and the race surface are very similar to those found in ball bearings.

The tractive force which may be usefully transmitted by a rolling contact depends upon the total surface pressure or load which presses the roller against the race surface, and a multitude of factors which for practical reasons have been combined under the term of "traction-coefficient." The maximum surface load that may be carried depends upon the material employed and the geometrical dimensions of the design, very similar to the conditions in a ball bearing. It is then clearly seen that for a given transmission operating at a given speed, the amount of power that may be usefully transmitted is directly proportional to the traction coefficient. And that any decrease in this traction coefficient would have to be compensated by an increase of the surface load, if the same amount of power as before were to be transmitted.

The great importance of the traction coefficient becomes even more apparent when it is considered that any increase of the surface load causes a shortening of the useful service life of the transmission, because fatigue failures will occur sooner under increased stresses, and furthermore that the efficiency of the transmission also decreases with any increase of the surface load, because the losses due to rolling resistance and friction increase with increasing load. This means more heat developed within the same space volume as before, and this required additional cooling has to be provided in order to keep the operating temperature at the same level as before. Under certain conditions, it is found that an increase of the surface load at least partially defeats its own purpose, because the traction coefficient depends upon the size of the contact between roller and race, and has a tendency to decrease with increasing size of the contact itself; so that the surface load must now be still further increased to make up for the partial decrease of the traction coefficient which was caused by the first increase of the surface load. This "law of diminishing returns" is a severe limitation in the design of variable speed friction type transmissions, and it further emphasizes the importance of maintaining the traction coefficient at the highest level.

Investigations of the useful traction coefficient obtainable from multi-roller variable speed transmissions in comparison with the traction obtainable from fixed speed (or rather, fixed ratio) roller or ball type transmissions in hundreds of tests disclosed a very great discrepancy between the values obtained from these two different types of transmission. In many cases, the traction coefficient with a variable speed race and roller type was only a fraction of ⅓ and sometimes even less of the traction coefficient obtainable with a fixed ratio roller transmission. It will be understood that this condition is extremely serious because the required increase in size of the transmission for a given amount of power substantially increases not only weight and space requirements, but also the cost to such an extent that it will rule out the use of such transmissions for many applications.

The above consideration of the influence of the traction coefficient in variable speed transmissions has been made to cover all aspects thereof in order that its importance as a vital factor may be fully understood, and appreciated. This was necessary because the present invention has for its main object the improvement of the traction coefficient obtainable, with toroidal race and roller type transmissions; without a full understanding of the complex interlinking of causes and effects which here can snowball into a result seemingly out of all proportion to its first cause, the purpose and structure disclosed by this invention might appear almost irrelevant.

It is also significant that fixed ratio roller or ball type transmissions have been built commercially with an efficiency of between 97.5 and 98.7% while variable ratio transmissions have usually shown between 89 and 92% efficiency under similar conditions. This means that in the latter case the amount of heat developed is 3–4 times as great as in the former case, and that means must be provided to dispose of this heat.

While there are several factors that can cause an increase or a decrease of the traction coefficient, as has been pointed out before, it was found extended series of tests have shown that one of the major factors influencing the traction coefficient is the degree of synchronization, or mis-synchronization, of the several rollers with respect to each other. In other words, since all of the rollers of one system deliver power "in parallel" from the driving to the driven race, it is clearly of great importance that they all deliver their individual share of the power at the space speed to the driven race. If there is a difference in speed, the faster roller tends to drive the race faster than the slow rollers and thus to transmit a greater share of the total power. But since the share of power which each roller can transmit is limited by the individual surface load for each roller (which surface load is the same for each roller), it appears that the faster roller is using up a portion of its useful tractive force in its attempt to fight the slower rollers, and therefore cannot transmit its original share of total power. The slower roller cannot transmit its full share of useful power either, because it also uses up a similar part of its traction in fighting the faster roller. As a result, the capacity of the transmission to transmit useful power is reduced, because a portion of the tractive force is used up internally. An attempt to increase the transmitted power by increasing the brake load upon the output shaft produces a drop in speed and a certain amount of slipping of the rolling contacts; these two signs indicate a decrease of the traction coefficient as against the original value. The effect upon measuring instruments, such as dynamometers outside of the transmission, is the same as if a perfectly synchronized transmission with correspondingly high original traction coefficient were provided with an energy absorbing brake inside its housing. In order to give an example of the severity of trouble caused by mis-synchronization in transmissions of the type referred to, it is mentioned that a difference of synchronism of between 2–5% may cause a drop of 33–50% in the useful traction coefficient.

While some attempts have been made to provide a better correlation of the tilting angles of the individual rollers than obtainable with conventional structures, such attempts have either failed because the proposed structures introduced new difficulties such as hunting or instability in the case of automatic devices for equalizing the load of the rollers, or such devices proved to be very expensive to make and required much more space than is economically available in practical applications.

In a given transmission of the type referred to, the speed ratio at which the individual roller transmits power from one race to the other is determined almost exclusively by the angle which is formed between the transmission axis and the plane of rotation of the roller, this angle is hereinafter referred to simply as "roller angle." The plane of rotation of the roller is perpendicular to the geometrical axis of rotation of the roller which it intersects at the center of the roller.

The requirements for a perfect synchronization therefore demands that all individual roller angles are always exactly the same and that they change also at the same rate whenever a change in speed ratio occasions a change of the roller angles. While these conditions cannot be fulfilled with mathematical accuracy, a fairly high degree of synchronization and correspondingly small tolerances for errors must be maintained, as will become apparent from the following example. In a certain transmission, tests showed that a roller with a speed ratio difference of plus 4% (i.e. tending to transmit power at 4% greater speed than the others), would carry 100% of the total load instead of its share of 33%, provided of course that the traction coefficient were great enough to transmit a tractive force three times greater than normal. Since this is not the case, the roller contacts develop a partial slip or creep which reduces its over-speed until the driving tractive force of the fast roller reduces enough to be balanced by the resisting tractive force of the slow rollers.

The final result is easily seen in case of a transmission with only two rollers, each of which receives one half of the total surface load. Then, the fast roller with 4% over-speed will increase its creep until it is 2% above normal speed, and the slow roller will be driven at a negative creep of 2%, which puts its speed also to 2% above normal.

With a creep of 2% against normal speed, each roller would now transmit 50% of its full share of tractive force, and this without any external torque load being imposed upon the transmission output shaft. Thus it is seen that the power transmitting capacity of the transmission is reduced to the remaining 50% of the total. The effect to the outside of the transmission is the same as if the traction coefficient had been reduced to 50% of its former value. Thus a mis-synchronization of 4% may cause an apparent drop of the traction coefficient of 50%. The conditions are actually somewhat more complex, particularly with more than 2 rollers, and also due to the fact that the linear proportionality between creep and tractive force, as here assumed, is actually modified by several other factors. However, the figures mentioned are basically correct and they give a fair indication of the accuracy required in the synchronization of the rollers of one system with respect to each other. In the considered design, a 4% speed difference is equivalent to about one degree eighteen minutes difference on roller angles; if we assume straight proportionality for the smaller angles, it follows that 2% speed difference is caused by about forty minutes angle difference and would bring with it nearly 25% drop in traction. If the loss of traction (or power transmitting capacity) is to be reduced to 3%, we find that the speed difference must be held to about ¼%. This means that the difference between individual roller angles must be held to five minutes or less. This is also the cumulative tolerance for the entire device which connects each roller to its neighbors. Since in the connection between two rollers for synchronization of their respective angles, more than one part and several dimensions are involved, it follows that the individual tolerances will have to be much smaller, i.e. only a fraction of five minutes.

When it is considered that in the conventional production of optical prisms, the angles between any two surfaces are held to a tolerance of 3–4 minutes, it becomes apparent that special structures are required to make it possible to obtain such high over-all accuracy between roller angles with normal production methods. Another factor which has not yet been considered, but which is no less important, concerns the stability and resistance to wear of the device. A mechanism interconnecting the rollers with the required accuracy of roller angles is still worthless, if deflection of parts or wear due to forces acting within the mechanism were to increase the angular errors beyond the tolerance limit under actual operating conditions. Several proposals have been made which comprise slender, complex parts or gears and which could give the required performance only under theoretical conditions.

As a result of measurements and observations on literally hundreds of transmissions of the type referred to, I have developed a new structure which is simple and rigid and which may be manufactured with present day machines at fairly reasonable prices. This new structure has an inherent high resistance to loss of accuracy through deflection, backlash through loose joints, and wear. This I accomplish by providing a minimum number of linkage elements between the individual rollers and arranging them in a geometric pattern which has a high inherent rigidity. So far as I know, this structure is a basically new solution to the problem of how to hold a plane parallel to another plane with a high degree of accuracy of parallelism and to move the two planes relatively to each other so as to increase or decrease their distance while maintaining a rigid parallelism with the same degree of accuracy even when outside forces tend to incline these planes towards each other.

The accompanying drawings illustrate by way of example one preferred form of embodiment of my invention.

Fig. 1 illustrates a view of a system of 3 rollers of a toric type transmission, as seen in the direction of the transmission axis.

Fig. 2 is an end view of one of the rollers, as seen in the direction of trunnion axis of the roller frame-carrier, also called the tilting axis; it is a partial section, with the plane of section going through the end trunnion and through the end of the coupling element.

Fig. 3 is an end view similar to that of Fig. 2, but with the roller omitted. It shows in dotted lines the positions of the roller carrier-frame for the positions of maximum angle to both sides of the position of zero angle, and also the position of part of the adjacent frame and sliding joint formed by the coupling elements.

Fig. 4 shows schematically the geometric axes, centers, angles and planes which form the basic principle of the structure, the view being taken in the same direction as that of Fig. 3.

Fig. 5 illustrates in perspective view one of the roller carrier-frames.

Fig. 6 shows in perspective view the three coupling elements which link the roller carrier-frames together, with one of the elements in a position parallel to the position which it would assume when assembled to the carrier-frame shown in Fig. 5.

Fig. 7 is a straight end view of the three coupling elements engaging each other at their ends, their relative position being similar to that of Fig. 1 if the roller carriers are omitted from Fig. 1.

Fig. 8 is a schematic illustration of the geometric axes of the three coupling elements showing their relative positions for a roller angle of zero and for roller angle alpha.

Fig. 9 is a simplified longitudinal section through a toric race and roller transmission of the kind here referred to; it shows only one roller in the position of angle zero, or 1:1 speed ratio between the two races. Since transmission of the toric race and roller type are well known in their general features, it was deemed adequate to use this simplified schematical section.

Referring again to Fig. 1, there are shown three rollers, denoted 10, 11, 12, which are rotatably supported by the respective shafts 16—17—18 in the carrier frames 13—14—15. A second frame member positioned on top of each carrier, and denoted 20 for the carrier 14 is also illustrated in Fig. 2. This member is held movable relatively to the carrier 14 by pivots 21—22 and serves as a special device for locating and controlling the position of the roller within the carrier 14. It does not form a subject matter to be claimed under this application and for the purpose of this application, the rollers may be regarded as simply rotatable upon the shafts 16—17—18 respectively for the rollers 10—11—12. The form of a single carrier frame, which is the same for all three carriers 13—14—15, is shown in enlarged scale in perspective view in Fig. 5. Clearly seen are the trunnions 24—24, which are aligned on the geometric tilting axis L—L for the carrier 14. For the other carriers, the geometric tilting axes are K—K for carrier 13 and M—M for the carrier 15, see Fig. 1. The trunnions themselves are not seen in Fig. 1 because they are hidden by the trunnion bearings 33—33, 34—34, 35—35. The trunnion bearings are fastened to the carrier-flange 9 which is common to all rollers. The position of the carrier flange 9 with respect to the races and the transmission axis are seen from Fig. 9. Referring again to Fig. 1, one of the trunnions of the carrier 13 is extended through the trunnion bearing 33 and is marked 23. This trunnion may be provided with a keyway or splines to permit adaptation of coupling means to an external control for tilting the roller carriers simultaneously and thereby effecting a change of all roller angles.

Referring to Fig. 5, there are provided on the carrier frame 14 two brackets or lobes denoted 44—44. Each of these has a bore which is in line with the geometrical axis E—E. This axis E—E is parallel to the trunnion geometrical axis L—L of the carrier frame 14, and spaced from it by the distance marked R. A pin, denoted 52 in Fig. 6, can be inserted with a very close fit free of backlash into the bores of the brackets 44—44, so that it can turn therein; the pin 52 when so inserted becomes the mechanical representation of the geometrical axis E—E.

Referring again to Fig. 1, it is seen that all three roller carriers, 13—14—15, are provided with brackets or lobes similarly to the one just described, and that there are three pins inserted in the respective bores. The ends of these pins engage each other in a manner illustrated more clearly in Fig. 6. The geometrical axis E, and the corresponding geometrical axes for the other carrier frames and pins have not been denoted in Fig. 1 in order to avoid crowding the drawing. The three pins, 51, 52, 53 are however shown in enlarged scale in Fig. 7 in a position relative to each other similar to that of Fig. 1, and in this Fig. 7 the geometrical axes D—D, E—E, F—F are indicated by dash-dotted lines.

Referring again to Fig. 5, it is shown that the carrier 14 is provided with two bores 42—43 which are aligned upon the geometrical axis N—N. These bores 42—43 serve to locate the shaft 17, Fig. 1, upon which the roller 11 rotates, see also Fig. 2. Again in Fig. 5, the geometric axis N—N intersects both the axis L—L and the axis E—E. Since axis E—E is parallel to axis L—L, as stated earlier, all three axes lie in one geometric plane, hereinafter referred to as the Roller-Axis-Trunnion-Axis plane. Referring again to Fig. 2, the plane of rotation of the roller, which goes through the center of the roller is denoted S—S. This plane is perpendicular to the roller axis N—N and contains the trunnion axis L—L. It also passes through the contact points of the roller with the race surfaces and thereby determines the speed ratio between the two races, as is illustrated in Fig. 9 where the roller is shown in the position which produces a 1:1 ratio, that is, the plane S—S is parallel to the geometric transmission axis H—H, or in other words, the roller angle is zero. Fig. 3 shows the roller carrier 14 for this same ratio position in full lines, and in dotted lines the carrier positions for a maximum roller angle to both sides of the central position. In this Fig. 3 the roller itself is represented only by its plane of rotation S—S. Fig. 3 can be regarded as an enlarged view of the carrier frame 14 of Fig. 1 as seen from the direction of the arrow A when the flange (and the trunnion bearings are supposed transparent). Fig. 3 also shows a portion of the neighboring roller carrier frame 15 of Fig. 1 and in partial section the end of the coupling pins which engage each other as also shown in Fig. 1.

The interrelation of the various geometric axes, planes and the roller angle can best be seen in Fig. 4 which is drawn at the same scale as Fig. 3 and represents a geometrical section along the line N—N in Fig. 1, seen in the same direction as Fig. 3.

The point C represents the center of the roller and at the same time the projection of the trunnion axis L—L which is perpendicular to the plane of the paper. The line $N_0$—$N_0$ represents the roller axis for a roller angle of zero; and at the same time the trace (intersection line) of the Roller-Axis-Trunnion-Axis plane with the plane of the paper, for the roller roller angle equal to zero. The point $E_0$ is the projection of the geometrical axis E—E of the coupling pin 52 of the carrier 14, which axis is perpendicular to the paper plane. The distance C—$E_0$ is of course the same as the distance between the parallel axes L—L and E—E, that is R (see Fig. 5).

If the roller is tilted, that is, the roller angle changed from zero to alpha, then point $E_0$ moves in a circle about center C with radius R, to a position denoted $E_1$. The roller axis moves from $N_0$—$N_0$ to $N_1$—$N_1$ and the plane of roller rotation from $S_0$—$S_0$ to $S_1$—$S_1$. The line $N_1$—$N_1$ represents also the trace of the roller-axis-trunnion-axis plane upon the paper plane and it intersects the transmission axis H—H no longer in the point $O_0$ as before, but in the point Q.

From Fig. 1 we see that there exist two triangles of axes, the one formed by the three trunnion axes K—K, L—L, M—M, which intersect each other in the respective points U, V, W. These three intersection points and the three axes determine one plane, called trunnion-axes-plane T—T. It is always perpendicular to the transmission axis H—H, which it intersects in the point $O_0$ and and it does not change its position when the roller angle is changed. The trace of this trunnion axis plane T—T is seen in Fig. 4 coinciding with the line C—$O_0$.

The other triangle of axes in Fig. 1 is formed by the geometrical axes of the coupling pins, D—D, E—E, F—F, which intersect in the points X, Y, Z. These are clearly shown in Fig. 7 and have been omitted from Fig. 1 to avoid crowding the drawing. It is also clearly seen from Fig. 4 in connection with Fig. 1 that these coupling pin axes, of which E—E is shown in Fig. 4, projected as the point $E_0$ for the zero angle position, are all positioned in the trunnion axes plane for the zero roller angle. Therefore, for the zero roller angle position, the line through C—$O_0$ in Fig. 4 represent four things:

(1) The roller rotation axis $N_0$—$N_0$,
(2) The trace of the trunnion axes plane (i.e. the plane determined by the three intersection points U, V, W),
(3) The trace of the plane $P_0$—$P_0$ determined by the three intersection points X, Y, Z, formed by the three geometric axes D—D, E—E, F—F, as shown in Fig. 7, and (4) The line through C—O₀ also represents the trace of the roller-axis-trunnion-axis plane T—T₁ of the roller 14.

When the roller angle is changed from zero to alpha, the above picture changes as follows:

(1) The roller rotation axis is now N₁—N₁,
(2) The trace of the plane of the trunnion axes triangle U—V—W remains as before on the line T—T,
(3) The trace of the pin axes triangle X—Y—Z is now at P₁—P₁ and
(4) The trace of the roller-axis-trunnion-axis plane is now along N₁—N₁.

It is also seen that the projection of the pin axis E—E which was in E₀ has now moved to E₁ which lies at the intersection of the roller-axis-trunnion-axis plane N₁—N₁ with the pin axes plane P₁—P₁.

It can now easily be shown that with the postulate of the distance R being exactly the same for all three roller carriers, the two planes T—T and P₁—P₁ will always be exactly parallel to each other, for any value of the angle alpha between zero and less than 90°, and that the angle alpha will be identical for each of the three roller carriers. If the carrier frame 14 is tilted at the angle alpha as shown Fig. 4, the pin axis E—E in its lifted position E₁—E₁ has a distance from the plane T—T of E₁—G equal to R sin alpha. This same condition prevails along the entire pin for any point along its axis, which includes the intersection points X at one end and Y at the other end. Since point X is also a point of the axis D—D, every point along D—D has the same distance R sin alpha from the plane T—T. And similarly, since point Y is also a point of the axis F—F, every point thereof has the same distance R sin alpha from the plane T—T. As a result, the plane of the triangle X—Y—Z must remain parallel with the plane T—T for any angle alpha, and the angles alpha are the same for each carrier frame, provided that R is the same for each frame. Only three relative motions occur:

(1) A limited rotation of the trunnions in their trunnion bearings; this kind of bearing can without difficulties be manufactured to accuracies of 0.0001 inch or better.
(2) A limited rotation of the coupling elements or pins against the carriers; this is likewise the case of a cylindrical bearing which can be made to the same accuracy as the trunnion bearing.
(3) A limited sliding motion of the coupling elements against each other, to permit their intersection points X—Y—Z to change their relative distances; the requirement for this motion follows from a consideration of Figs. 4, 7 and 8.

In Fig. 4 it is seen that the pin axis E—E for alpha zero is at E₀ (its projection upon the paper plane) and for a positive angle alpha it is at E₁. The distance of the axis E—E from the transmission axis has therefore increased from E₀—O₀ to E₁—O₁; it is seen that the increase is R(1—cos alpha). The same holds true for all other axes D—D and F—F. This is seen in Fig. 8 where the axis positions D₁—D₁, E₁—E₁, F₁—F₁ are projected into the plane of D₀—D₀, E₀—E₀, F₀—F₀. It is evident that the intersection points X—Y—Z move outwards to new positions X₁—Y₁—Z₁. This motion increases the relative distance of the points X—Y—Z and the design must provide for this increase. The design of tongue and slot illustrated in all figures is only one of the many ways in which this invention may be carried out. It is clear from the foregoing explanation that the accuracy of position of the slot laterally of the geometrical pin axis is not important, as long as the geometrical axis through any two intersection points X—Y—Z is parallel to the respective trunnion axes K—K, L—L, M—M of its related roller carrier and provided the distance R is accurately the same for all of the roller carriers.

In the embodiment illustrated in the Figs. 1, 2, 5, 6 and 7, the mobility of the intersection points X, Y, Z is provided by flat tongues 56—58—60 on one end of the coupling pins, see Fig. 7, and by slots denoted 65—67—69 which are cut into the reinforced heads 55—57—59 at the other end of the coupling pins 51—52—53, see Fig. 6. In order to make the pins interchangeable, the thickness of the tongue for all pins should be to the same close tolerance and the two sides should be symmetrical with respect to the geometrical axis of the pin. The flat surfaces of the tongues, for example, the flat 60 of pin 53 must be accurately parallel to, and preferably in the same plane with, the flat surface 69 of the slot in the head 59 at the other end, see Fig. 6. If this condition is not met, the two ends of the pin would have a twist against each other, and if the other pins were similarly made, it would be impossible to bring them into one plane, as the last joint to be closed would show the cumulative error of all 3 pins; the pins joined together would then form a sort of spiral, instead of a figure in one plane. This can also be overcome by giving one end of the pins a slight crown, that is replace, the flats by a slightly convex surface, which engages a flat surface of the other pin. While this method imposes less limitations of accuracy, it also reduces the wear resistance of the design; if for example the flat sides of the tongues are replaced by cylindrical surfaces of slight curvature, with the axis of the cylinder being parallel to the axis of the pin, it is seen that this tongue can now engage a slot of parallel flat surfaces which may be slightly tilted with respect to the flat surfaces forming the slot at the other end of the pin. But the contact area between the tongue surfaces and the slot surfaces is now a line contact, whereas formerly it was an "area" contact. A line contact offers less resistance to wear than an area contact because of the different specific pressure acting in each case for the same transmitted force, and because of the different amounts of material that has to be worn off before an equal amount of looseness—backlash—develops. It is also possible to replace the flat tongues at the one end of the pins by balls of a diameter to fit the slots at the other ends of the pins. This reduces the contact area to a so-called point contact, for which the wearing qualities are worse than for a line contact; this could of course be improved by making the engaging surfaces of the slot curved to cylindrical surfaces of the same curvature as the ball and thus obtain again a line contact.

It is obvious that various other designs can be developed to obtain the same results, and all of these designs will have the same basic structure, as herein disclosed. Some of these designs may not show pins, as here used, but have coupling elements which incorporate the intersection points X—Y—Z and have limited freerom of sliding motion in the direction of the geometrical axes D—D, E—E or F—F as the case may be, and have a limited freedom of rotation about the same axis. The maximum angular or rotational freedom is given by the maximum angle alpha for tilting the roller to each side of the zero position; and the maximum freedom of sliding motion of which the elements representing the intersection points X, Y, Z, must be capable is given by the section of E₁—E₁ which lies between its intersections with D₀—D₀ and D₁—D₁, Fig. 8.

While the new basic structure has been described in its application to a design having three roller carriers to be tilted in perfect synchronization, it is to be noted that the new structure may as well be applied to systems with four or more rollers arranged with their centers in one plane square to the transmission axis.

All of these possible variations can be reduced to the same basic structure which may be summarized to comprise as its basic elements; at least three roller carriers each of which has a geometric trunnion axis and a geometric coupling axis parallel to and equidistant from each other; one member holding all of the geometric trunnion axes within one geometric plane and coupling elements engaging the carriers in alignment with the geometric coupling axes to establish the intersection points of each two adjacent geometric coupling axes which intersection points establish the position of one geometric plane always parallel to the first mentioned plane common to all of the trunnion axes.

While I have described my invention in one specific form of embodiment, I have also described the basic structure as it applies to variations and alterations of the design illustrated; it is therefore to be understood that I consider such variations of the design here illustrated as falling within the scope of this invention which shall be limited only by the following claims.

What I claim is:

1. In a race and roller type transmission, a pair of races having substantially toroidal surfaces and a plurality of rollers positioned therebetween in rolling contact with said races, means for simultaneously controlling the tilting angle or all of said rollers, said means comprising a carrier for each of said rollers, said carrier being tiltable about a geometrical trunnion axis, a member positioning all of said trunnion axes within one plane substantially at right angles to the axis of said toroidal races, coupling elements equal in number to said carriers, said coupling elements being relatively rotatable with respect to said carriers and engaging said carriers along a geometrical coupling axis for each carrier which is parallel to the respective trunnion axis, the distance between said coupling axis and said trunnion axis being the same for all of said carriers, said coupling elements extending beyond the ends of the carriers whereby the tilting motion of one carrier is transmitted to its adjacent carriers directly through said coupling elements.

2. In a race and roller type transmission, a plurality of rollers in rolling contact with the toroidal surfaces of said races, a tiltable carrier for each of said rollers, means for simultaneously varying the tilting angle of all of said rollers, said means comprising at least one coupling element for each of said rollers, each of said coupling elements having at least one flat surface in slidable contact with a corresponding surface of the coupling element of the adjacent roller, the flat surfaces of all of said coupling elements of all rollers being positioned in one common plane perpendicular to the geometrical axis of said races.

3. In a variable speed transmission, races having toroidal surfaces and a plurality of rollers in driving contact therewith, supporting means for said rollers comprising a tiltable member for each roller having a geometric axis about which it can be tilted, and control means for simultaneously changing the tilting angle of all of said members, said last named means comprising a coupling element for each of said tiltable members capable of limited rotational motion with respect to said member the coupling elements of adjacent tiltable members being adapted to make contact with each other substantially at the geometrical symmetry plane of the angle formed by the tilting axes of the respecting tilting members.

4. In a variable speed transmission of the type referred to, races with toroidal surfaces and rollers positioned therebetween, supporting means for said rollers comprising a tiltable member for each of said rollers, a trunnion upon said tiltable member aligned on the geometrical tilting axis of said roller, a trunnion bearing for said trunnion, a member supporting all of said trunnion bearings with all of said trunnion axes in one geometric plane perpendicular to the axis of said races, a cylindrical bore on each tiltable member aligned upon a geometric coupling axis parallel to and equidistant from said geometric trunnion axis, and coupling elements cooperating with said cylindrical bores of each pair of adjacent tiltable members, said coupling elements extending to the point of intersection of the coupling axes of adjacent tiltable members and adapted to maintain permanently the intersection of the geometric coupling axes of adjacent tiltable members, within one geometric plane common to all of said intersection points.

5. In a variable speed transmission having toroidal races and a plurality of rollers in driving contact therewith, a tiltable carrier for each of said rollers, a coupling element for each of said carriers, said element extending substantially parallel to the tilting axis of said tiltable carrier and each of said coupling elements adapted to engage directly the coupling element of an adjacent carrier with a surface-to-surface contact movable substantially in the plane of angular symmetry of the respective tilting axes of said carriers.

6. In a variable speed transmission of the type described, a plurality of tiltable rollers in driving contact with the toroidal surfaces of the races, a supporting yoke for each roller tiltable about a trunnion axis substantially at right angles to the geometrical axis of said races, a coupling pin for each of said yokes extending parallel to and equidistant from said trunnion axis of the respective yoke, each of said pins being capable of limited rotational motion with respect to its respective yoke, and each of said pins provided at each end with at least one flat surface positioned to maintain surface-to-surface contact with a corresponding flat surface of the coupling pin of the adjacent yoke.

7. In a transmission of the type referred to, a plurality of rollers in driving contact with a pair of toroidal races, a tiltable carrier for each of said rollers and an equal number of coupling elements, each of said carriers having a trunnion axis, a member supporting all of said carriers with their individual trunnion axes positioned in one geometric plane common to all, each of said carriers having cylindrical surfaces formed thereon about a geometrical axis extending parallel to its trunnion axis, said coupling element fitting said cylindrical surfaces capable of limited motion relatively thereto, said coupling elements extending along said geometric axes substantially to their points of intersection with each other and adapted to permanently maintain within one plane the intersection points between each two adjacent geomertic axes for all angles of tilt of said carriers, whereby said geometric plane is parallel to the aforesaid plane of the trunnion axes irrespective of the angle of tilt of said carriers.

References Cited in the file of this patent

UNITED STATES PATENTS

| | | |
|---|---|---|
| 2,097,633 | Madle | Nov. 2, 1937 |
| 2,646,696 | Kepes | July 28, 1953 |